United States Patent [19]

Shearing

[11] 3,977,889

[45] Aug. 31, 1976

[54] CEMENT COMPOSITIONS

[75] Inventor: Herbert Jackson Shearing, Manchester, England

[73] Assignee: Imperial Chemical Industries Limited, London, England

[22] Filed: Apr. 11, 1975

[21] Appl. No.: 567,074

[30] Foreign Application Priority Data

Apr. 30, 1974 United Kingdom............... 18877/74

[52] U.S. Cl............................... 106/96; 260/77.5 R; 260/77.5 AP; 260/2.5 AM; 260/28 R; 260/29.2 TN
[51] Int. Cl.² ........................................ C04B 7/356
[58] Field of Search............................... 106/90, 96; 260/29.2 TN, 2.5 AM, 77.5 R, 77.5 AP, 28

[56] References Cited
UNITED STATES PATENTS

| | | | |
|---|---|---|---|
| 1,744,869 | 1/1930 | Cross | 106/96 |
| 3,412,050 | 11/1968 | Elkin et al. | 260/77.5 AP |
| 3,772,051 | 11/1973 | Shearing | 106/90 |
| 3,778,290 | 12/1973 | Shearing | 106/90 |

*Primary Examiner*—Winston A. Douglas
*Assistant Examiner*—John P. Sheehan
*Attorney, Agent, or Firm*—Cushman, Darby & Cushman

[57] ABSTRACT

Cement compositions setting readily at temperatures below 0° C are disclosed which are prepared by mixing together and allowing to cure a hydraulic cement, an inert filler, an organic polyisocyanate, water and coal tar. The organic polyisocyanate is used in an amount to provide an excess of isocyanate groups over the isocyanate-reactive groups contained in the coal tar itself; the weight of organic polyisocyanate and coal tar, taken together, is at least equal to the weight of the water used. Such compositions, improved by the addition of coal tar, exhibit advantages over conventional cement mixes and known urethane, epoxy and polyester resin-containing concretes.

11 Claims, No Drawings

CEMENT COMPOSITIONS

This invention relates to cement compositions and more particularly to isocyanate-based cement compositions having improved low temperature setting properties.

U.K. Patent No. 1,192,864 describes and claims cement compositions having as essential ingredients a hydraulic cement, a silica filler, water and an organic compound containing a plurality of isocyanate groups. Usually these compositions also contain at least one isocyanate-reactive organic compound, especially a polyol, since shrinkage of the composition on setting and curing is thereby minimised, and the polyol also acts to some extent as an internal plasticiser, providing an element of flexibility in the cured product.

It has now been found that cured compositions having improved properties are obtained if, in the invention described in the U.K. Pat. No. 1,192,864, the polyol component of the compositions is replaced at least in part by coal tar.

According to the present invention there is provided a composition which is the product obtained by mixing together and allowing to cure a hydraulic cement, an inert filler, an organic polyisocyanate, water and coal tar.

The term "hydraulic cement" is used in its usual sense to denote the class of structural materials which are applied in admixture with water and which thereafter harden or set as a result of physical and/or chemical changes which consume the water present. As well as Portland cement it includes:

1. Rapid hardening cements, as characterised by those with high alumina contents.
2. Low-heat cements as characterised by high percentages of decalcium silicate and tetracalcium aluminoferrite and low percentages of tricalcium silicate and tricalcium aluminate.
3. Sulphate-resisting cements as characterised by unusually high percentages of tricalcium silicate and dicalcium silicate and unusually low percentages of tricalcium aluminate and tetracalcium aluminoferrite.
4. Portland blast-furnace cement as characterised by a mixture of Portland cement clinker and granulated slag.
5. Cements normally used in masonry work and characterised by mixtures of Portland cement and one or more of the following: hydrated lime, pulverised limestone, colloidal clay, diatomaceous earth or other finely-divided forms of silica.
6. Natural cements as characterised by material obtained from deposits in the Lehigh Valley, U.S.
7. Lime cements as characterised by oxide of calcium in its pure or impure forms and whether or not containing some argillaceous material.
8. Selenitic cement as characterised by the addition of 5–10% of plaster of Paris to lime.
9. Pozzolanic cement as characterised by the mixture of pozzolana, trass, kieselguhr, pumice, tufa, santorin earth or granulated slag with lime mortar.
10. Calcium sulphate cements as characterised by those depending upon the hydration of calcium sulphate and including plaster of Paris, Keene's cement and Parian cement.
11. Waterproofed cements as characterised by mixtures of Portland cement with calcium stearate or paraffin.

The preferred hydraulic cement is Portland cement.

Examples of inert fillers which may be used are sand, gravel and like aggregate having a low clay content and preferably washed; natural crushed ores and mineral aggregates; an aluminium silicate refractory aggregate made by high temperature calcination of a china clay specially selected for low iron and low alkali content, and obtainable commercially under the name "Molochite" (Registered Trade Mark); crushed mineral aggregates manufactured from blue flints obtained from deposits in the Thames Valley and available commercially under the name "Flintag" (Registered Trade Mark), and a high-density material comprising small, rough-surfaced spheres of iron oxide which are a by-product from the regeneration plant of some steel works. The particle size of the filler is preferably in the range from 1 micron to 2 cm.

Examples of organic polyisocyanates which may be used are aliphatic diisocyanates such as tetramethylene diisocyanate, hexamethylene diisocyanate, 2,2,4- and 2,4,4-trimethylhexamethylene diisocyanates; cycloaliphatic diisocyanates such as dicyclohexylmethane-4,4'-diisocyanate, 1-methyl cyclohexane-2,6-diisocyanate and 3-isocyanatomethyl-3,5,5-trimethylcyclohexylisocyanate (also known as isophorone diisocyanate); aromatic diisocyanates such as tolylene-2,4-diisocyanate tolylene-2,6-diisocyanate, diphenylmethane-4,4'-diisocyanate, 3-methyldiphenylmethane-4,4'-diisocyanate, m- and p - phenylene diisocyanates, chlorophenylene-2,4-diisocyanate, xylylene diisocyanates, naphthalene-1,5-diisocyanate, diphenyl-4,4'-diisocyanate, 4,4'-diisocyanato-3,3'-dimethyldiphenyl and diphenylether diisocyanates. Triisocyanates which may be used include aromatic triisocyanates such as 2,4,6-triisocyanatotoluene and triisocyanatodiphenylether. Other suitable polyisocyanates include the reaction products of an excess of a diisocyanate with simple polyhydric alcohols such as ethylene glycol, propylene glycol, diethylene glycol, dipropylene glycol, 1,3-, 1,4- and 2,3-butane diols, pentamethylene glycol, hexamethylene glycol, neopentylene glycol, glycerol, hexane triols including trimethylolpropane, pentaerythritol and the low molecular weight reaction products of the above-mentioned polyols with ethylene oxide and/or propylene oxide.

Other organic polyisocyanates which may be used are uretedione dimers and isocyanurate polymers of diisocyanates, for example tolylene-2,4-diisocyanate, tolylene-2,6-diisocyanate and mixtures thereof, and the biuret polyisocyanates obtained by reaction of polyisocyanates with water.

There may also be used isocyanate-ended prepolymers obtained by reaction of excess of an organic diisocyanate with a polymeric polyol, for example, a hydroxyl-ended polyester, polyesteramide or polyether.

Examples of suitable hydroxyl-ended polyesters and polyesteramides for use in the preparation of prepolymers are those obtained by known methods from dicarboxylic acids, glycols and, as necessary, minor proportions of diamines or aminoalcohols. Suitable dicarboxylic acids include succinic, glutaric, adipic, suberic, azelaic, sebacic, phthalic, isophthalic and terephthalic acids and mixtures of these. Examples of dihydric alcohols suitable for polyester preparation are ethylene glycol, propylene glycol, 1,3-, 1,4- and 2,3-butanediols, diethylene glycol, trimethylene glycol, tetramethylene glycol, pentamethylene glycol, hexamethylene glycol, decamethylene glycol and 2,2-dimethyltrimethylene glycol (neopentyleneglycol). Suitable diamines or aminoalcohols which can be used in minor proportions when polyesteramides are to be prepared include ethylene diamine, hexamethylene diamine, monoethanolamine and m and p - phenylene diamines. Mixtures of polyesters and polyesteramides may be used. Small proportions of polyhydric alcohols such as glycerol or trimethylolpropane may also be used, in which case branched polyesters and polyesteramides are obtained.

Examples of suitable hydroxyl-ended polyethers for use in the preparation of prepolymers are polymers and copolymers of cyclic oxides, for example, 1,2-alkylene oxides such as ethylene oxide, propylene oxide, epichlorohydrin, 1,2- and 2,3-butylene oxides, oxycyclobutane and substituted oxycyclobutanes and tetrahydrofuran. There may also be mentioned the polyethers obtained by the polymerisation of an alkylene oxide in the presence of a basic catalyst and water, a glycol or a primary monoamine. Mixtures of polyethers may be used.

Mixtures of organic polyisocyanates may be used in preparing compositions according to the present invention.

A preferred organic polyisocyanate is the product known as crude MDI, which is a mixture obtained by phosgenation of the mixed polyamines prepared by the reaction of formaldehyde with aniline in the presence of hydrochloric acid, and which consists of diphenylmethane-4,4'-diisocyanate in admixture with isomers thereof and with methylene-linked poly(phenyl isocyanates) containing more than two isocyanate groups. Similar products can be obtained by using, for example, ortho-toluidine in place of aniline or in admixture with aniline for reaction with formaldehyde.

Coal tar is a by-product of the carbonisation of coal for the production of coke and/or gas, and is a highly complex material containing as major isocyanate-reactive ingredients numerous phenolic compounds and nitrogenous organic bases in addition to a wide variety of hydrocarbons and minor constituents. For a general discussion on the manufacture and composition of coal tars, reference is made to the article at pages 653 – 682 in Volume 19 of the Kirk-Othmer Encyclopedia of Chemical Technology, 2nd Edition, published in 1969 by Interscience Publishers. Although some constituents of coal tar are not isocyanate-reactive, for the purposes of calculation in this specification coal tar is regarded as an isocyanate-reactive material in its entirety.

Coal tar may be the sole isocyanate-reactive organic material which is used in preparing the compositions according to the present invention, or it may be used together with other organic isocyanate-reactive-compounds; in which case the coal tar will constitute at least 1% of the total weight of organic isocyanate-reactive materials. It is preferred that the coal tar content is from 5 to 95% by weight of the organic isocyanate-reactive materials.

The other isocyanate-reactive organic compounds which may be used together with coal tar include any of those hydroxyl-ended polyesters, polyesteramides and polyethers disclosed above as being suitable for the preparation of isocyanate-ended prepolymers; simple polyhydric alcohols containing from 2 to 6 carbon atoms and from 2 to 4 hydroxyl groups and the low molecular weight reaction products thereof with ethylene oxide and/or propylene oxide; also aminoalcohols such as monoethanolamine, polyamines such as ethylenediamine, hexamethylenediamine, m - and p - phenylenediamines and 2,4- and 2,6-diaminotoluenes, epoxy resins which also contain isocyanate-reactive groups, for example, the hydroxyl group-containing products obtained by reaction between diphenylolpropane and epichlorohydrin, drying oil and non-drying oil modified alkyd resins, castor oil, urethane oils which are the reaction products of diisocyanates with the alcoholysis products of a drying oil, for example, mono- or di-glycerides from linseed oil, and urethane alkyds which are alkyd resins in which a part of the phthalic anhydride has been replaced by a diisocyanate.

A preferred isocyanate-reactive organic compound is a resin obtained by the high temperature reaction of castor oil with the complex resin prepared by reacting together natural rosin, glycerol and a resol resin at a high temperature. The castor oil and the complex resin may be reacted in the proportions from 95:5 to 20:80 parts by weight at a temperature from 230° to 250°C for a time from 1/2 to 2 hours. Typically, castor oil and the complex resin in the proportion of 4:1 by weight are heated together at a temperature of approximately 240°C for about 45 minutes. To prepare the complex resin, natural rosin (colophony), glycerol, and the resol (prepared by the condensation of 1 mole of diphenylolpropane with approximately 4 moles of formaldehyde under aqueous alkaline conditions at moderate temperatures) in the proportion of approximately 8.2:1.1:1.0 by weight are heated at a temperature of up to 275°C in an inert atmosphere until the acid value of the product is less than 20 mg KOH/g.

A second preferred isocyanate-reactive organic compound is the mixed polyester obtained by known methods from 1,3-butanediol, hexanetriol and adipic acid in the mol ratio 3:1:3.

In making up compositions according to the present invention, plasticisers may also be incorporated into the mixture. Plasticisers are high-boiling, inert organic liquids which remain in the cured composition and impart some measure of flexibility to it. The plasticiser may also assist in the mixing operation by lowering the viscosity of the mix. Examples of suitable plasticisers are esters such as butyl benzyl phthalate, dibutyl phthalate, tricresyl phosphate, octyl epoxy stearate, high boiling liquid chlorinated hydrocarbons such as those obtainable commercially under the name "Cereclor" (Registered Trade Mark) and the glycidyl ester of Versatic acid, obtainable commercially under the name Cardura E ("Cardura" is a Registered Trade Mark).

There may also be used volatile organic solvents of the kind which are conventionally used in the formulation of polyurethane products, such solvents being inert towards isocyanate and hydroxyl groups. Suitable solvents include esters, ketones, hydrocarbons and halogenated hydrocarbons. Specific solvents which may be used are methyl ethyl ketone, methyl isobutyl ketone, 4-methyl-4-methoxylpentan-2-one, ethyl acetate, butyl acetate, ethoxyethyl acetate, cyclohexanone, toluene and xylene. It is preferred not to use such volatile solvents because they add to the cost of the compositions, cause pollution of the atmosphere and may give rise to a flammability hazard.

A wide variation in the proportions of the different ingredients of the compositions is possible. Thus, per 100 parts by weight of hydraulic cement there may be used from 10 to 20,000 parts by weight of inert filler, from 5 to 150 parts by weight of water, from 5 to 4,000 parts by weight of urethane resin-forming components (defined as organic polyisocyanate together with coal tar and any other organic isocyanate-reactive compounds) from 5 to 4,000 parts by weight of plasticiser, and from 0 to 400 parts by weight of solvent. Preferred quantities are from 50 to 12,000 parts of filler, from 10 to 100 parts of water, from 10 to 3,000 parts of urethane resin-forming components, and from 10 to 3,000 parts of plasticiser per 100 parts of cement.

In order to obtain a cured product having a satisfactory compression strength (i.e. at least 500 lb./in$^2$; 35 Kg/cm$^2$) it is necessary that the organic polyisocyanate is used in amount such that there is an excess of isocyanate groups over the isocyanate-reactive groups contained in the coal tar and any other organic isocyanate-reactive material which is used, and also that the weight of urethane resin-forming components as hereinbefore defined is at least equal to the weight of water used.

The present invention has the advantage over that described and claimed in U.K. Pat. No. 1,192,864 that the compositions will cure and set hard at temperatures below 0°C., a result which cannot be achieved with the previously known compositions even by including catalysts for the isocyanate/hydroxyl reaction in the compositions. This low temperature curing ability is of importance when surfacing and coating operations have to be carried out in the open under very cold conditions where conventional cement mixes and those containing epoxy or polyester resins will not set.

The compositions of the present invention, in addition to their uses in providing flooring surfaces, are particularly valuable for the protective coating of pipelines, for example, offshore oil pipelines and gas pipelines, and can be cast around pipework giving both corrosion and abrasion protection. Work can be carried out at temperatures below freezing point which are often encountered when pipe laying under winter conditions and in exposed regions. The compositions can also be used to coat inclined or vertical surfaces, subject to the mixture having a suitably high viscosity on application and before curing reaches an advanced stage.

Other advantages shown by the present compositions containing coal tar over the composition of U.K. Pat. No. 1,192,864 lie in their greater speed of setting under comparable conditions and improved strength properties and resistance to water-borne chemical attack of the cured compositions.

The invention is illustrated but not limited by the following Examples in which parts and percentages are by weight.

EXAMPLE 1

The following mixes were prepared:

|  | Mix No. | | |
|---|---|---|---|
|  | 1 | 2 | 3 |
| Castor oil/complex resin reaction product* | 80 | 48 | 32 |
| Coal tar, viscosity approx. 9 poises at 25°C. | — | 32 | 48 |
| Butyl benzyl phthalate (plasticiser) | 35 | 35 | 35 |
| Water | 50 | 50 | 50 |
| Portland cement | 180 | 180 | 180 |
| Sand | 545 | 545 | 545 |
| Crude MDI** | 140 | 140 | 140 |

*As described on page 9, lines 7 – 16
**As described on page 7, lines 10 – 15

Mix No. 1 is a comparative experiment containing no coal tar. In No. 2 40% of the resin has been replaced by tar and in No. 3 60% of the resin has been replaced.

Each of the mixtures was poured into cube moulds (side area 50cm$^2$) and the following approximate setting times were observed.

| Mix No.1 | 2½ hours |
|---|---|
| Mix No.2 | 1 hour |
| Mix No.3 | 45 minutes |

After about 5 hours the cubes were removed from the moulds and allowed to stand overnight (approximately 16 hours) at room temperature. Compression strength tests on the cubes gave the following results:

| No.1 | 2800 | lb/in$^2$ (196 Kg/cm$^2$) |
|---|---|---|
| No.2 | 3480 | lb/in$^2$ (244 Kg/cm$^2$) |
| No.3 | 3625 | lb/in$^2$ (254 Kg/cm$^2$) |

EXAMPLE 2

Comparative low-temperature setting test. Mixtures identical in composition with those identified as Nos. 1 and 3 in Example 1 were made up as follows. All the liquid components other than the crude MDI were mixed together, and this mixture together with the mixed dry sand and cement and the MDI itself were placed in separate containers, sealed and kept at −2° to −3°C for 48 hours. The ice crystals in the container holding the resins and water were crushed to small size and the other materials were added and mixed in. The mixes were then transferred to cube moulds (side area 50cm$^2$) which were maintained at a temperature of −2° to −3°C.) for 24 hours. After this time the compositions were removed from the moulds and immediately subjected to a compression test. Formulation No. 1 was still soft and very much undercured, and gave an indeterminate reading of about 60 lb./in$^2$ (4.2 Kg/cm$^2$), but No. 3 was set hard and gave a compression strength reading of 1700 lb./in$^2$ (119 Kg/cm$^2$). Such a material laid ½ inch thick on a floor could be opened to most traffic after 24 hours and to light foot traffic after 12-15 hours.

EXAMPLE 3

The following mixes were prepared:

|  | 1 | 2 (comparative) |
|---|---|---|
| Castor oil/complex resin reaction product (as in Example 1) | 2 | 4 |
| Coal tar (as in Example 1) | 2 | — |
| Butyl benzyl phthalate | 7 | 7 |
| Xylene | 4 | 4 |
| Water | 7.5 | 7.5 |
| Crude MDI (as in Example 1) | 5 | 5 |
| Portland cement | 100 | 100 |
| Sand | 10 | 10 |

After the above ingredients had in each case been mixed together to give a homogeneous composition, the latter was poured into cube moulds of side area 50 cm$^2$ and allowed to cure for 24 hours. The compression strengths of the cubes were then compared, and whereas the cube from mix 1 gave a value of 755 lb/in² (53 kg/cm²) that from mix 2 had a value 670 lb/in² (47 kg/cm²).

EXAMPLE 4

The following mixes were prepared:

|  | 1 | 2 (comparative) |
|---|---|---|
| Castor oil/complex resin reaction product (as in Example 1) | 300 | 600 |
| Coal tar (as in Example 1) | 300 | — |
| Butyl benzyl phthalate | 40 | 40 |
| Xylene | 600 | 600 |
| Water | 100 | 100 |
| Polyisocyanate solution (see below) | 3000 | 3000 |
| Portland Cement | 100 | 100 |
| Sand | 20000 | 20000 |

The polyisocyanate solution used in the two mixes described above is obtained as follows:

A mixture of tolylene diisocyanate (1 mol proportion), trimethylolpropane (0.197 mol proportion) and butylene glycol (0.159 mol proportion) is heated for 2 hours at 60°C in the presence of half their combined weight of a 1:1 mixture of β-ethoxyethyl acetate and xylene. Oxypropylated glycerol of molecular weight approximately 3000 (0.029 mol proportion) is then added and heating is continued for 4 hours at 60°C. Sufficient xylene is then added to give a solution having a solids content of 70%.

After the ingredients of each mixture had been mixed together to give a homogeneous composition, the latter was poured into cube moulds of side area 50 cm² and allowed to cure for 24 hours. The compression strengths of the cubes were then compared. Mix 1 gave a value of 930 lb/in² (65 Kg/cm²) and mix 2 gave a value of 775 lb/in² (53 Kg/cm²).

We claim:

1. A composition which is the product obtained by mixing together and allowing to cure a hydraulic cement, an inert filler, an organic polyisocyanate, water and coal tar, the organic polyisocyanate being used in an amount such that there is an excess of isocyanate groups over the isocyanate-reactive groups in the coal tar, and the weight of organic polyisocyanate and coal tar taken together being at least equal to the weight of water used.

2. A composition as claimed in claim 1 wherein the hydraulic cement is Portland cement.

3. A composition as claimed in claim 1 wherein the organic polyisocyanate consists of diphenylmethane-4,4'-diisocyanate in admixture with isomers thereof and with methylene-linked poly(phenylisocyanates) containing more than two isocyanate groups.

4. A composition as claimed in claim 1 which contains an organic isocyanate-reactive compound in addition to coal tar, the polyisocyanate being used in an amount in excess over the coal tar and additional organic isocyanate-reactive compound taken together, and provided the weight of organic polyisocyanate, coal tar and additional isocyanate-reactive organic compound taken together is at least equal to the weight of water used.

5. A composition as claimed in claim 4 wherein the organic isocyanate-reactive compound is the high temperature reaction product of castor oil with the resin obtained by reacting together at a high temperature natural rosin, glycerol and the resol resin derived from 1 mol of diphenylolpropane and approximately 4 moles of formaldehyde.

6. A composition as claimed in claim 4 wherein the organic isocyanate-reactive compound is the polyester from 1,3-butanediol, hexametriol and adipic acid in the mol ratio 3:1:3.

7. A composition as claimed in claim 4 wherein the coal tar constitutes at least 1% of the total weight of organic isocyanate-reactive materials.

8. A composition as claimed in claim 7 wherein the coal tar content is from 5 to 95% by weight of the organic isocyanate-reactive materials.

9. A composition as claimed in claim 4 which also contains a high-boiling point inert organic plasticiser selected from the group consisting of esters and chlorinated hydrocarbons.

10. A composition as claimed in claim 9 which comprises from 10 to 20000 parts by weight of inert filler, from 5 to 150 parts by weight of water, from 5 to 4000 parts by weight of organic polyisocyanate, coal tar and other isocyanate reactive organic compounds taken together and from 5 to 4000 parts by weight of plasticiser per 100 parts by weight of hydraulic cement.

11. A composition as claimed in claim 10 which comprises from 50 to 12000 parts by weight of inert filler, from 10 to 100 parts by weight of water, from 10 to 3000 parts by weight of organic polyisocyanate, coal tar and other isocyanate-reactive organic compounds taken together and from 10 to 3000 parts by weight of plasticiser per 100 parts by weight of hydraulic cement.

* * * * *